(12) United States Patent
Bauchot et al.

(10) Patent No.: US 9,298,474 B2
(45) Date of Patent: Mar. 29, 2016

(54) SYSTEM AND METHOD FOR MANAGING A FLOATING WINDOW

(75) Inventors: Frederic Bauchot, Saint-Jeannet (FR); Jean-Luc Collet, La Gaude (FR); Marc Charles Fiammante, Sr Laurent du Var (FR); Gerard Marmigere, Drap (FR); Joaquin Picon, Paul Cezanne (FR)

(73) Assignee: International Business Machines Corporation, Armonk, NY (US)

(*) Notice: Subject to any disclaimer, the term of this patent is extended or adjusted under 35 U.S.C. 154(b) by 2676 days.

(21) Appl. No.: 11/245,230

(22) Filed: Oct. 5, 2005

(65) Prior Publication Data

US 2006/0075359 A1    Apr. 6, 2006

(30) Foreign Application Priority Data

Oct. 6, 2004   (EP) .................................... 04300660

(51) Int. Cl.
*G06F 9/44*       (2006.01)

(52) U.S. Cl.
CPC .................................... *G06F 9/4443* (2013.01)

(58) Field of Classification Search
USPC .......... 715/794, 790, 788, 784, 781, 766, 764
See application file for complete search history.

(56) References Cited

U.S. PATENT DOCUMENTS

| 5,619,639 | A  | * | 4/1997  | Mast .............................. 715/798 |
| 5,812,132 | A  |   | 9/1998  | Goldstein |
| 6,025,841 | A  |   | 2/2000  | Finkelstein et al. |
| 6,721,950 | B1 |   | 4/2004  | Lupu |
| 6,981,223 | B2 | * | 12/2005 | Becker et al. ................. 715/753 |
| 7,036,089 | B2 | * | 4/2006  | Bauer ........................... 715/827 |
| 2003/0088413 | A1 |   | 5/2003  | Gomez |

FOREIGN PATENT DOCUMENTS

| JP | 2001-325054 | 11/2001 |
| WO | 0073920 | 7/2000 |

* cited by examiner

*Primary Examiner* — Jeffrey A Gaffin
*Assistant Examiner* — Sabrina Greene
(74) *Attorney, Agent, or Firm* — Schmeiser, Olsen & Watts, LLP; John Pivnichny (57) ABSTRACT

A method and system for managing overlapping windows on a computer screen of a computer system. A hook filter intercepts an event that has occurred. An association of the hook filter with the event was established prior to the occurrence of the event. The event is characterized by an overlapping condition in which a floating window partially or totally overlaps an active window on the computer screen. A software application is associated with the active window. Response to intercepting the event, the hook filter detects the overlapping condition. Response to detecting the overlapping condition, the hook filter eliminates the overlapping condition to make the active window totally visible.

30 Claims, 5 Drawing Sheets

TOPMOST WINDOW TABLE 330

| WINDOW HANDLE 300 310 | WINDOW NORMAL POSITION (NP) 320 | WINDOW ESCAPE POSITION (EP) | MOVED WINDOW (MW) 340 | HIDDEN WINDOW (HW) 350 |
|---|---|---|---|---|
| 0xA7CF | X1,Y1,X2,Y2 | X1',Y1',X2',Y2' | FALSE | FALSE |
| 0xA7BB | : | | | |
| : | : | | | |
| | | | | |
| | | | | |

SYSTEM AND METHOD FOR MANAGING A FLOATING WINDOW

BACKGROUND OF THE INVENTION

1. Technical Field

The present invention relates generally to the display of information on computer screens and more particularly to a method and system for managing a floating window on a computer screen.

2. Related Art

An application sets attributes to keep the windows in the foreground even when the windows are not active. For example, a user may need to monitor an activity on a particular application (such as the connection to a network) while working on another application. However, the fact that a given window stays in the foreground (this kind of window will be called "Floating window" in the present description) even when this window in the foreground is not active, has some drawbacks. A floating window may partially or totally hide the active window and mask therefore interesting parts of the active window. In this case, the user has some solutions such as moving the floating window in an area which does not overlap the active window. The user has also the possibility to resize the floating window to see the interesting parts of the active window. However these actions are not always convenient if, for instance, the user is entering text while the active window is in full screen mode and one or more floating windows are opened. In this case, the typed text or cursor may be hidden by the floating window. Some solutions exist but need to be implemented in the application which manages the active window. One of solutions proposed by the company APPLE is use of a procedure which sets the cursor appropriately, depending on whether a document window or modeless dialogue box is active or not. This solution has a drawback as all applications have to implement and call this procedure.

For some applications, it is interesting to keep the window associated with the application visible even when the focus is on a different application window. In the example illustrated in FIG. 1, the window corresponding to the dictionary application remains visible even when the user enters data on a different application.

Figure 1:
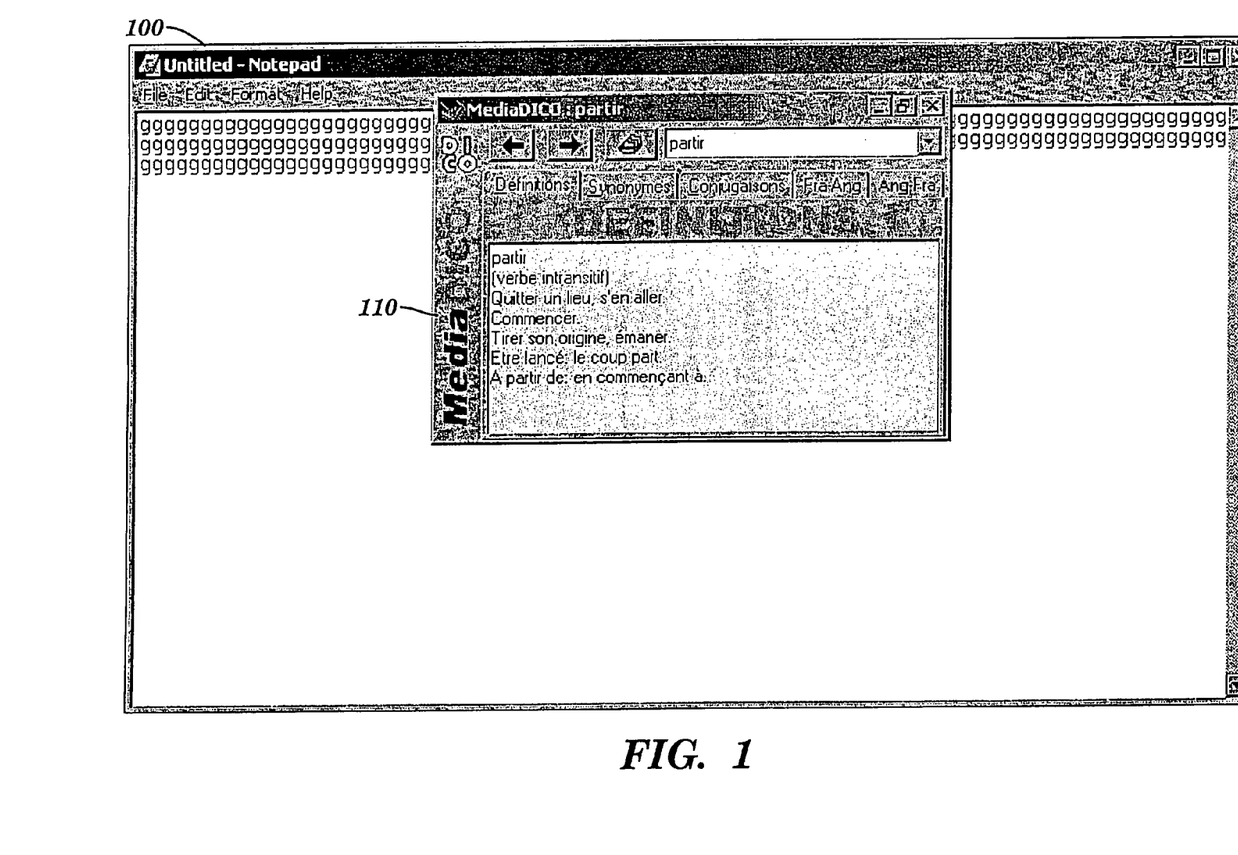
FIG. 1 illustrates an example where the window corresponding to a dictionary application remains visible even when the user enters data on a different application (e.g Notepad application).

The problem is that the cursor and the text that is being entered on the screen disappear behind the window of the front end application. This situation remains until the cursor leaves the front end application area. In such a situation, the user needs to close or move the front end window to see the cursor and text that is being entered.

SUMMARY OF THE INVENTION

The present invention provides a computer implemented method for managing overlapping windows on a computer screen of a computer system, said method comprising:

intercepting by a hook filter an event that has occurred, an association of the hook filter with the event having been established prior to the occurrence of the event, the event being characterized by an overlapping condition in which a floating window partially or totally overlaps an active window on the computer screen, a software application being associated with the active window;

response to said intercepting, detecting by the hook filter the overlapping condition; and responsive to said detecting, eliminating the overlapping condition to make the active window totally visible.

The present invention provides a computer system comprising a computer program, said computer program comprising instructions, said computer program adapted to be executed on the computer system such that the instructions implement a method for managing overlapping windows on a computer screen of the computer system, said method comprising:

intercepting by a hook filter an event that has occurred, an association of the hook filter with the event having been established prior to the occurrence of the event, the event being characterized by an overlapping condition in which a floating window partially or totally overlaps an active window on the computer screen, a software application being associated with the active window;

response to said intercepting, detecting by the hook filter the overlapping condition; and responsive to said detecting, eliminating the overlapping condition to make the active window totally visible.

The present invention provides a computer program comprising instructions, said computer program adapted to be executed on a computer system such that the instructions implement a method for managing overlapping windows on a computer screen of the computer system, said method comprising:

intercepting by a hook filter an event that has occurred, an association of the hook filter with the event having been established prior to the occurrence of the event, the event being characterized by an overlapping condition in which a floating window partially or totally overlaps an active window on the computer screen, a software application being associated with the active window;

response to said intercepting, detecting by the hook filter the overlapping condition; and responsive to said detecting, eliminating the overlapping condition to make the active window totally visible.

BRIEF DESCRIPTION OF THE DRAWINGS

The present invention will best be understood by reference to the detailed description of illustrative embodiments when read in conjunction with the accompanying drawings.

DETAILED DESCRIPTION OF THE INVENTION

The present invention is directed to a system, method and computer program or managing a floating window on a computer screen of a computer system according to its relative position with an active window associated with a software application, so that the active window remains totally or partially visible on the computer screen. The computer program comprises instructions stored on a computer readable storage medium of the computer system, wherein the instructions are configured to implement the methods of the present invention by being executed by the computer system. A processor of the computer system executes the instructions. The computer readable storage medium with the instructions stored thereon is denoted as a computer program product.

When the floating window partially or totally hides the active window, the floating window is either moved, or resized or removed. The floating window is restored to its initial size and position on the computer screen as soon as the initial floating window does not partially or totally hide the active window any more.

When the cursor hits the front end window, this front end window is automatically moved to keep the text that is being entered visible. To do this, a daemon spies and tracks all the user input activities such as the mouse and the keyboard inputs. Thus, a floating window is moved or minimized when the cursor belonging to the window of an active application (i.e., an application being executed) is going to be masked or is masked by a floating window and/or when the window partially or totally hides an active window.

The present invention advantageously avoids any modification to applications running in the system.

An embodiment of the present invention relies on all the Microsoft Windows ("Windows" is a trademark of Microsoft Corporation) operating system family. In a graphical Microsoft Windows-based application, a window is a rectangular area of the screen where an application displays output and receives input from the user. A window shares the screen with other windows, including windows from other applications. Only one window at a time, can receive input from the user. The user can use the mouse, the keyboard, or any other input device to interact with this window and the application that owns it. Microsoft's windows can be of different types (Overlapped, Pop-up, Child, Layered, Message Only). The various window types will not be described in detail in the present description. The present invention utilizes z-order windowing and a hook mechanism The z-order of a window indicates the position of the window in a stack of overlapping windows. This window stack is oriented along an imaginary axis, the z-axis, extending outward from the screen. The window at the top of the z-order overlaps all other windows. The window at the bottom of the z-order is overlapped by all other windows.

The system maintains the z-order in a single list. The system adds windows to the z-order based on whether they are topmost windows, top-level windows, or child windows.

A topmost window overlaps all other non-topmost windows, regardless of whether it is the active or foreground window. A topmost window has the WS EX TOPMOST style. All topmost windows appear in the z-order before any non-topmost window.

A top-level window is a window with no parents except the main desktop window versus child windows belonging to a top level window.

A child window is grouped with its parent in z-order.

In the Microsoft Windows operating system, a hook is a mechanism by which a function can intercept events (messages, mouse actions, keystrokes) before they reach an application. The function can act on events and can, in some cases, modify or discard these events. Functions that receive events are called filter functions and are classified according to the type of event they intercept. For example, a filter function may want to receive all keyboard or mouse events. For Windows, the filter function must be installed—that is, attached—to a Windows hook (for example, to a keyboard hook) to be called. Attaching one or more filter functions to a hook is known as setting a hook. If a hook has more than one filter function attached, Windows maintains a chain of filter functions. The most recently installed function is at the beginning of the chain, and the least recently installed function is at the end of the chain.

The Win32® (a trademark of Microsoft Corporation) Application Programming Interface (API) provides a set of functions to access and modify: the z-order list; the windows position and styles; and the hook operating system mechanism.

With the Microsoft Windows Operating system, all the graphical windows are message driven. All the windows have at least one thread responsible to process messages received from the system (e.g., user mouse events). This thread is called the WindowProc and it can send messages to any other windows/applications.

Figure 2:
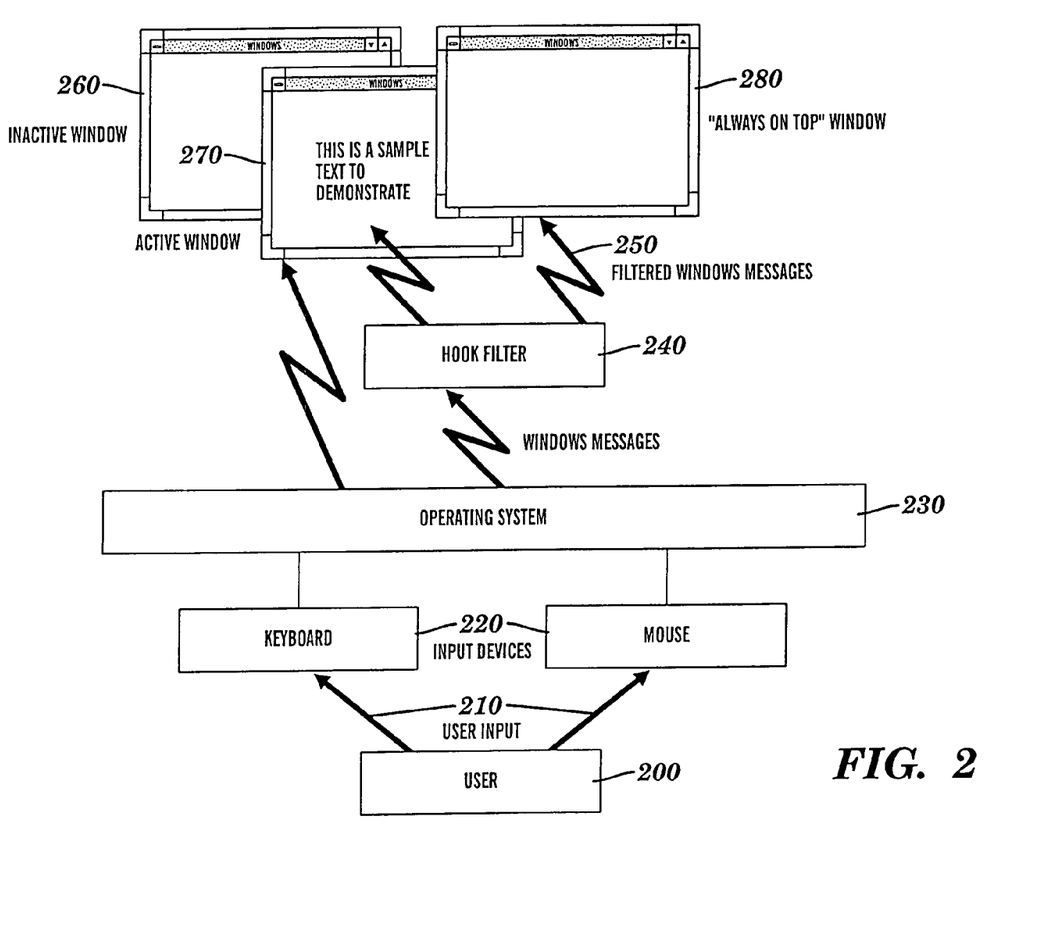
FIG. 2 shows the basic principles of the invention.

As illustrated in FIG. 2, an active window 270 is defined as being the top-level window of the application with which the user is currently working. To easily identify the active window, the system places this window at the top of the z-order in the z-order list and may change the color of its title bar and border (blue window 270). Only a top-level window can be an active window. The others windows are inactive (e.g., black window 260). Only windows at the top z-order list having the attribute topmost (e.g., red window 280) can overlap an active window.

A user 200 interacts with the active window (e.g., active window 270) using an input device (220) (the keyboard for example) for entering an input 210. By typing onto the keyboard, the user sends inputs 250 to the active window through the Operating system 230.

A filter daemon (Hook Filter 240) intercepts all the messages coming from the keyboard and the mouse. For each message filtered, when the active window is partially overlapped by a topmost window (e.g., hiding the cursor position of an edit text area), the filter daemon automatically moves all the topmost windows (hiding a part of the client area of the current active window 270) to the nearest position to maintain the active window totally visible (See FIG. 2)

If such action is not possible due to the screen and windows size, then the filter minimizes all topmost windows during the time the user interacts with the active window. When the active window becomes inactive, then the filter restores the topmost windows to its memorised initial position.

In term of implementation on the Windows Operation System, a daemon filter is a dynamic library registered as a hook filter at the system level using the Win32® API. Each time an event occurs (ex: mouse click), the system calls the filter functions registered for this event family and sends to said filter functions the message.

Hooks mechanisms provide powerful capabilities for Windows-based applications. These applications can set a hook using several options.

These applications may process or modify all messages meant for all the dialogue boxes, message boxes, scroll bars, or menus for an application (WH_MSGFILTER).

These applications may process or modify all messages meant for all the dialogue boxes, message boxes, scroll bars, or menus for the system (WH_SYSMSGFILTER).

These applications may process or modify all messages for the system whenever a GetMessage or a PeekMessage function is called (WH_GETMESSAGE).

These applications may process or modify all messages whenever a SendMessage function is called (WH_CALL-WNDPROC).

These applications may record or play back keyboard and mouse events (WH_JOURNALRECORD, WH_JOURNAL-PLAYBACK).

These applications may process, modify, or remove keyboard events (WH_KEYBOARD).

These applications may process, modify, or discard mouse events (WH_MOUSE). These applications may respond to certain system actions, making it possible to develop computer-based training (CBT) for applications (WH_CBT).

These applications may prevent another filter from being called (WH_DEBUG).

Applications use hooks to provide F1 help key support to menus, dialogue boxes, and message boxes (WH_MSGFILTER).

Applications use hooks to provide mouse and keystroke record and playback features, often referred to as macros. For example, the Windows Recorder accessory program uses hooks to supply record and playback functionality (WH_JOURNALRECORD, WH_JOURNALPLAYBACK).

Applications use hooks to monitor messages to determine which messages are being sent to a particular window or which actions a message generates (WH_GETMESSAGE, WH_CALLWNDPROC). The Spy utility program in the Platform SDK uses hooks to perform these tasks. The source for Spy is available in the SDK.

Applications use hooks to simulate mouse and keyboard input (WH_JOURNALPLAYBACK). Hooks provide a reliable way to simulate these activities. If you try to simulate these events by sending or posting messages, Windows internals do not update the keyboard or mouse state, which can lead to unexpected behaviour. If hooks are used to play back keyboard or mouse events, these events are processed exactly like real keyboard or mouse events. Microsoft Excel uses hooks to implement its SEND.KEYS macro function.

Applications use hooks to provide CBT for applications that run in the Windows environment (WH_CBT). The WH_CBT hook makes developing CBT applications much easier.

Working Area (WA) is defined as screen area where the user is currently working. The working area is part of the active window. It can be an area centred around the current cursor, with an offset in each direction, or it can be a child window of the active window, such as for instance a confirmation pop-up window. Anyway, a working area is delimited by its top left and bottom right corners, with respective coordinates (WAX1, WAY1) and (WAX2, WAY2).

A Floating Window (FW) is a window in the foreground, possibly hiding part of the active window, such as the working area. This kind of window is also called Topmost window A Screen Event (SE) is an event resulting from the detection of a modification of the video buffer, resulting in some embodiments from a displacement of the cursor on the FW.

An Overlap Condition (OC) is a Boolean variable equal to False if and only if the WA and the Topmost window NP are disjoint.

A Slip Direction (SD is a variable specifying the direction offset along which a floating window FW is moved.

A Normal Position (NP) is defined a variable specifying the regular position taken by a floating window FW on the screen An Escape Position (EP): variable specifying the position taken by a floating window FW if the overlap condition OC is true and if the floating window FW is not slipping.

Figure 4:
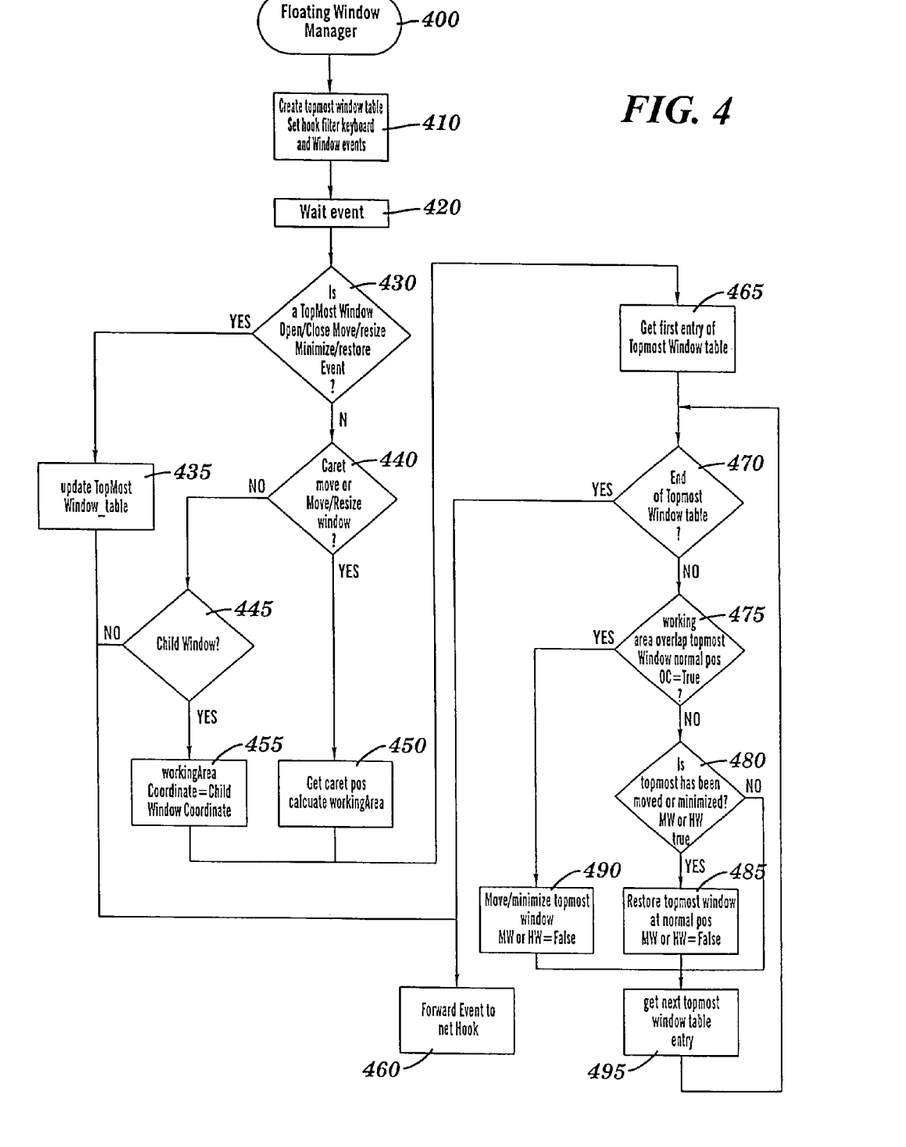
FIG.4 is a flow chart showing the different steps of the method according to the present invention.

A Moved Window (MW) is a Boolean variable specifying, if equal to True, that the floating window FW does not stand in its normal position A Hidden Window (HW): Boolean variable specifying, if equal to True, that the floating window FW is hidden Moveable (true/false) specifies if the working area WA can be moved Slip (true/false), when Moveable is equal to True and if the overlap condition OC is equal to True, specifies if the floating window FW moves to a fixed position, or slips to a neighbour position along the direction slip direction SD FIG. 4 is a flow chart of the method according to the preferred embodiment of the invention. The floating window manager 400 is the application in charge to install and remove the proposed implementation.

In the Microsoft Windows Operating System environment, a Hook Filter is a dynamic library registered at the system level. To set such filter, it is necessary to initialise and configure the Hook mechanism using the SetWindowsHook Win32® API (Application Programming Interface). The same kind of action is needed to remove such filter from the system using the UnhookWindowsHook Win32® API. During initialization, a Topmost Window Table 300 is created. Said table is described in FIG. 3. If multiple Topmost windows exist, then multiple entries are created in said Topmost Window Table 300, one entry for each existing Topmost window. For each record in the table, the following fields are initialized: (1) "Window handle" 310 (unique identifier for a window in the Win32® OS, used to communicate with said window); and (2) initial window coordinate "Window Normal Position (NP)" 320. Each record comprises the following additional fields: "Window Escape Position (EP)" 330; "Window Moved Position (MW)" 340; and "Hidden Window (HW)" 350.

The method illustrated in FIG. 4 for managing a floating window on a computer screen, comprises the following steps.

At step 410, setting the hook filter comprises registering a dynamic library exporting a callback function executed each time an event occurs. As previously described, a hook can be set up with different kinds of events (WH_KEYBOARD, WH_MOUSE, . . . )

In this example, the hook filter is set both on the windows events and on the keyboard events (WH_KEYBOARD & WH_GETMESSAGE & WH_CALLWNDPROC). The hook filter is notified whenever a window is activated and/or a key is pressed on the keyboard.

At step 420, the Win32® operating system maintains a list of all the active hooks set up by applications. Each time an event occurs, the Win32® operating system lookups in this list to send the event message to all the callback functions registered for such type of event.

The callback function is called with the event message as parameter, followed by execution of the application code.

In the present invention, the code executed comprises tracking all topmost windows on top of the active window hiding either a part of the text edit zone or a child window of the active window (e.g., Save document dialogue box).

At step 430, when an event is received, an initial checking is done to identify if this event is either an initialization, or a close, or a minimize, or a maximize, or a resize or a move of a Topmost window. If the received event is one of these events, then control is given to step 435; otherwise control is given to step 440.

Figure 3:
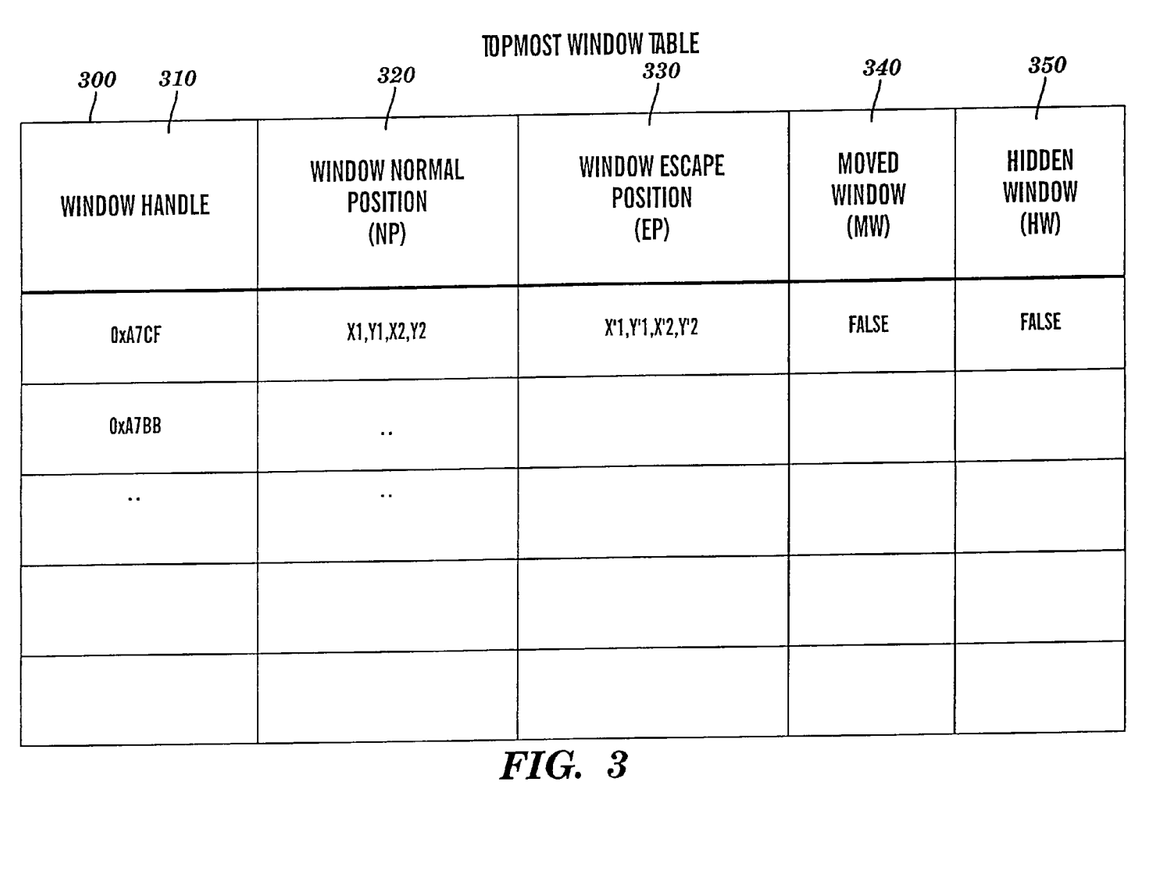
FIG. 3 describes the Topmost Window Table according to the present invention.

At step 435, the Topmost Window Table 300 is updated.

If the event is an initialization of a Topmost window, a new entry is created in the Topmost Window Table 300 and the fields "Window Handle" 310 and "Window Normal Position (NP)" 320 are initialized.

If the event is a close of a topmost window or if the event is a minimize not requested by a process (e.g., when "Hidden Window (HW)" field 350 is set to False), the corresponding entry in the Topmost Window Table 300 is removed.

Finally if the event is a move or resize of a topmost window, the field "Window Normal Position (NP)" 320 of the entry corresponding to this topmost window is updated to reflect the new position of said topmost window.

Then control is given to step 460.

At step 440, if the event received during the previous step 420 is not for a topmost window, a checking is performed to identify if the event is a caret move. If the event is a caret move, then control is given to step 450; otherwise control is given to step 445.

At step 445, a test is performed to check if the event corresponds to the opening of a child window. If the event corresponds to the opening of a child window, then control is given to step 455; otherwise control is given to step 460.

At step 450, using the caret coordinates carried by the event, a Working Area (WA in short) coordinate is calculated. The working area WA is a rectangular area which is centered on the caret position. Said working area WA is represented by coordinates WAX1,WAY1,WAX2,WAY2 like any window, where WAX1, WAY1 are the coordinates of the up/left corner and where WAX2, WAY2 are the coordinates of the down/right corner. The values of WAX1, WAY1, WAX2, WAY2 are calculated by adding or subtracting an offset DX or DY to the caret coordinates CX, CY. So WAX1=CX−DX, WAY1=CY−DY, WAX2=CX+DX, WAY2=CY+DY. Then control is given to step 465.

At step 455, the working area coordinates are set equal to the coordinates of the child window, and then control is given to step 465.

At step 460, the event is forwarded to the next hook or to the target application, and control is given back to step 420 in order to wait for the next-to-come event.

At step 465, the Topmost Window Table 500 is scanned to verify if the normal position (NP) of a topmost window which has been moved or minimized does not overlap the working area. The process of verification is initialized by getting the first entry of the Topmost Window Table 500.

At step 470, a test if performed to check if the end of the Topmost Window Table 300 has been reached. If the end of the Topmost Window Table 300 has been reached, then control is given to step 460, otherwise control is given to step 475.

At step 475, a test is performed to check if the working area overlaps the topmost area identified by the "Window Normal Position (NP)" field 320. If it is the case, then control is given to step 490; otherwise control is given to step 480.

At step 480, a test is performed to check if the topmost window has been previously moved. If the topmost window has been previously moved, then control is given to step 485; otherwise control is given to step 495.

At step 485, the topmost window is moved back to its normal position, as specified by the "Window Normal Position (NP)" field 320. The "Moved Window (MW)" field 340 is set to False. In an alternate embodiment, when the topmost window has been minimized, the move to the initial position is replaced by a restore window and the "Hidden Window (HW)" field 350 is set to False. Then control is given to step 495.

At step 490, the Topmost window is moved to a new position with no overlapping with the working area WA. The "Moved Window (MW)" field 340 is set equal to the value True. In an alternate embodiment, the topmost window is minimized instead of being moved if the "Hidden Window (HW)" field 350 is set to true. Then control is given to step 495.

At step 495, the next Topmost Window Table 300 entry is pointed and the control is given back to step 470.

The present embodiment also offers the possibility of applying different topmost window management policy to an application which launches the active window. There are at least two policies: (1) a CARET policy; and (2) a Window policy.

With the CARET policy, the topmost window is moved to a new position relative to the cursor position (caret). This policy is very useful for text editors such as Microsoft Word, Lotus Wordpro, Notepad or any other text editor.

With the Window policy, the topmost window is moved out of the active window if there is enough space to keep the topmost window entirely visible. If there is not enough space to keep said topmost window entirely visible, then the topmost window is minimized until space is cleared to allow the display of the topmost window. This policy is used by applications with a complex user interface comprising many input fields (e.g., a CRM product like SIEBEL® or a development platform such Eclipse packaged in WSAD by IBM).

Figure 5:
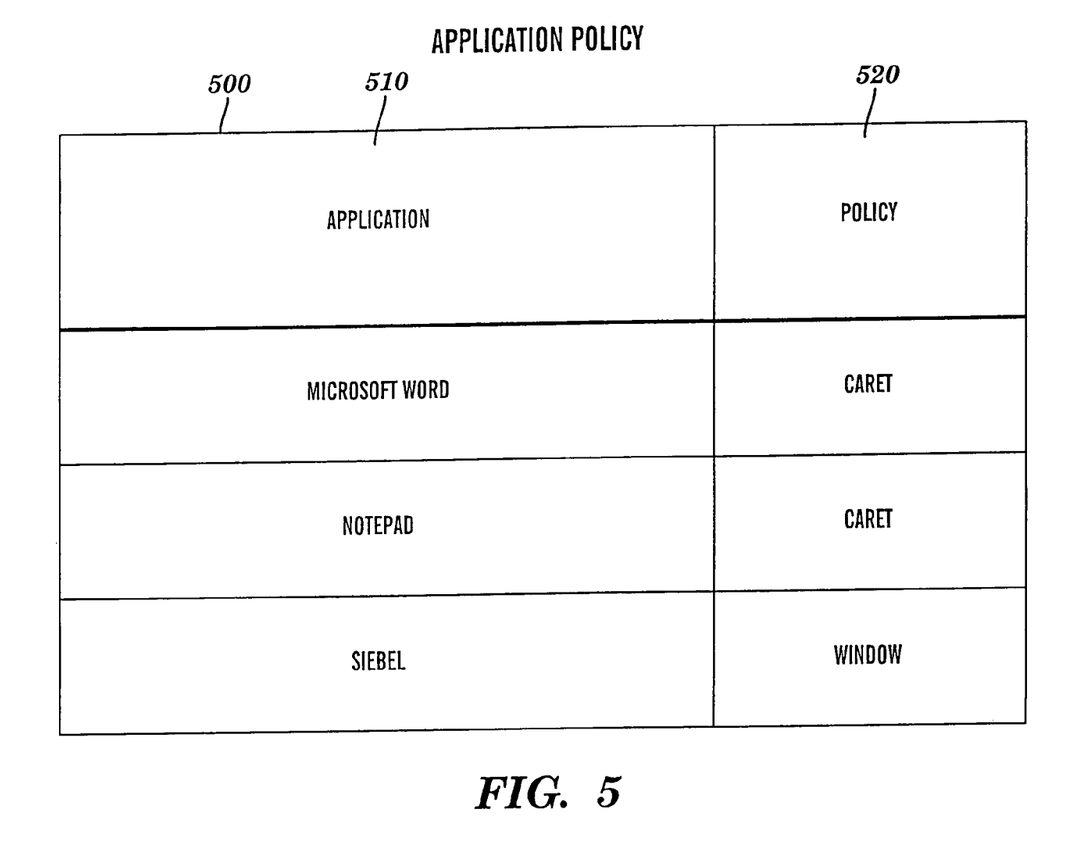
FIG. 5 shows the configuration file used to define for each application a topmost window management policy according to the present invention.

As shown in FIG. 5, this capability is based on a user's defined list of applications 500 provided to the floating window manager in a configuration file. When a new window is created, the corresponding event is intercepted by the floating window manager. From the window, the floating window manager identifies the associated application 510 and applies the rule defined in the Policy field 520.

While running this application, the user may launch another application using a floating window. The window associated to the new application is then handled by the floating window manager as described in the preferred embodiment of the invention which may apply appropriate policy to manage topmost window.

What has been described is merely illustrative of the application of the principles of the present invention. Other arrangements and methods can be implemented by those skilled in the art without departing from the spirit and scope of the present invention.

What is claimed is:

1. A computer implemented method for managing overlapping windows on a computer screen of a computer system, said method comprising:
   intercepting by a hook filter an event directed to a target application, said hook filter intercepting the event before the event reaches the target application, an association of the hook filter with the event having been established prior to the occurrence of the event, the event being characterized by an overlapping condition in which a floating window partially or totally overlaps an active window on the computer screen, a software application being executed in the active window;
   responsive to said intercepting, detecting by the hook filter the overlapping condition; and
   responsive to said detecting, eliminating the overlapping condition to make the active window totally visible.

2. The method of claim 1, said method comprising:
   recording parameters of the floating window in a table, said parameters prevailing upon said intercepting;
   after said eliminating and responsive to the active window becoming inactive, restoring the floating window on the computer screen in accordance with the recorded parameters;
   wherein the parameters comprise an overlap condition parameter, a hidden window parameter, window normal position parameters, and window escape parameters;
   wherein the overlap condition parameter is a Boolean variable equal to False if a working area and the floating window are disjoint and otherwise equal to True, subject to the working area being an area of the computer screen in which a user of the computer system is currently working;

wherein the hidden window parameter is a Boolean variable equal to True if the floating window does not stand in its normal location and otherwise equal to or False;

wherein the window normal position parameters specify the normal location of the floating window on the computer screen prevailing upon said intercepting;

wherein the window escape position parameters specify an escape location on the computer screen to be subsequently occupied by the floating window if the overlap condition is True and if the floating window is not configured to slip to a neighboring location along a specified slip direction.

3. The method of claim 1, said method comprising:
detecting the event by an operating system that is executing on the computer system; and
invoking the hook filter to execute said intercepting, said invoking being performed by the operating system by utilizing the association of the hook filter with the event.

4. The method of claim 1, wherein an operating system executing on the computer system maintains a single list that describes a window stack of windows on the computer screen, wherein the window stack is described in the list in accordance with a z-order of the windows on the computer screen such that the windows in the z-order are ordered along a z-axis that extends outward from the computer screen, wherein a topmost window at the top of the z-order overlaps all other windows in the z-order, wherein a window at the bottom of the z-order is overlapped by all other windows in the z-order, and wherein the z-order comprises the floating window and the active window.

5. The method of claim 1, wherein the overlapping condition comprises the floating window overlapping a cursor on the active window.

6. The method of claim 1, wherein said eliminating consists of moving the floating window.

7. The method of claim 6, wherein the action is dependent upon an executing application being executed within the active window, and wherein the executing application consists of the software application.

8. The method of claim 6, wherein the action is dependent upon an executing application being executed within the floating window.

9. The method of claim 1, wherein the event is a window event selected from the group consisting of an initialization of the floating window, a close of the floating window, a minimize of the floating window, a maximize of the floating window, a resize of the floating window, and a move of the floating window.

10. The method of claim 1, wherein the event is selected from the group consisting of a key event triggered by pressing a key on a keyboard that is coupled to the computer system and a mouse event triggered by moving a mouse that is coupled to the computer system.

11. A computer system comprising a processor and a computer readable storage medium, said storage medium containing instructions configured to be executed by the processor implement a method for managing overlapping windows on a computer screen of the computer system, said method comprising:
intercepting by a hook filter an event directed to a target application, said hook filter intercepting the event before the event reaches the target application, an association of the hook filter with the event having been established prior to the occurrence of the event, the event being characterized by an overlapping condition in which a floating window partially or totally overlaps an active window on the computer screen, a software application being executed in the active window;
responsive to said intercepting, detecting by the hook filter the overlapping condition; and
responsive to said detecting, eliminating the overlapping condition to make the active window totally visible.

12. The computer system of claim 11, said method comprising:
recording parameters of the floating window, said parameters prevailing upon said intercepting;
after said eliminating and responsive to the active window becoming inactive, restoring the floating window on the computer screen in accordance with the recorded parameters;
wherein the parameters comprise an overlap condition parameter, a hidden window parameter, window normal position parameters, and window escape parameters;
wherein the overlap condition parameter is a Boolean variable equal to False if a working area and the floating window are disjoint and otherwise equal to True, subject to the working area being an area of the computer screen in which a user of the computer system is currently working;
wherein the hidden window parameter is a Boolean variable equal to True if the floating window does not stand in its normal location and otherwise equal to False;
wherein the window normal position parameters specify the normal location of the floating window on the computer screen prevailing upon said intercepting;
wherein the window escape position parameters specify an escape location on the computer screen to be subsequently occupied by the floating window if the overlap condition is True and if the floating window is not configured to slip to a neighboring location along a specified slip direction.

13. The computer system of claim 11, said method comprising:
detecting the event by an operating system that is executing on the computer system; and
invoking the hook filter to execute said intercepting, said invoking being performed by the operating system by utilizing the association of the hook filter with the event.

14. The computer system of claim 11, wherein an operating system executing on the computer system maintains a single list that describes a window stack of windows on the computer screen, wherein the window stack is described in the list in accordance with a z-order of the windows on the computer screen such that the windows in the z-order are ordered along a z-axis that extends outward from the computer screen, wherein a topmost window at the top of the z-order overlaps all other windows in the z-order, wherein a window at the bottom of the z-order is overlapped by all other windows in the z-order, and wherein the z-order comprises the floating window and the active window.

15. The computer system of claim 11, wherein the overlapping condition comprises the floating window overlapping a cursor on the active window.

16. The computer system of claim 11, wherein said eliminating consists of moving the floating window.

17. The computer system of claim 16, wherein the action is dependent upon an executing application being executed within the active window, and wherein the executing application consists of the software application.

18. The computer system of claim 16, wherein the action is dependent upon an executing application being executed within the floating window.

19. The computer system of claim 11, wherein the event is a window event selected from the group consisting of an initialization of the floating window, a close of the floating window, a minimize of the floating window, a maximize of the floating window, a resize of the floating window, and a move of the floating window.

20. The computer system of claim 11, wherein the event is selected from the group consisting of a key event triggered by pressing a key on a keyboard that is coupled to the computer system and a mouse event triggered by moving a mouse that is coupled to the computer system.

21. A computer program product, comprising a computer readable non-transitory storage medium having instructions stored therein, said instructions configured to implement a method for managing overlapping windows on a computer screen of a computer system, said method comprising:
  intercepting by a hook filter an event directed to a target application, said hook filter intercepting the event before the event reaches the target application, an association of the hook filter with the event having been established prior to the occurrence of the event, the event being characterized by an overlapping condition in which a floating window partially or totally overlaps an active window on the computer screen, a software application being executed in the active window;
  responsive to said intercepting, detecting by the hook filter the overlapping condition; and
  responsive to said detecting, eliminating the overlapping condition to make the active window totally visible.

22. The computer program product of claim 21, said method comprising:
  recording parameters of the floating window in a table, said parameters prevailing upon said intercepting;
  after said eliminating and responsive to the active window becoming inactive, restoring the floating window on the computer screen in accordance with the recorded parameters;
  wherein the parameters comprise an overlap condition parameter, a hidden window parameter, window normal position parameters, and window escape parameters;
  wherein the overlap condition parameter is a Boolean variable equal to False if a working area and the floating window are disjoint and otherwise equal to True, subject to the working area being an area of the computer screen in which a user of the computer system is currently working;
  wherein the hidden window parameter is a Boolean variable equal to True if the floating window does not stand in its normal location and otherwise equal to False;
  wherein the window normal position parameters specify the normal location of the floating window on the computer screen prevailing upon said intercepting;
  wherein the window escape position parameters specify an escape location on the computer screen to be subsequently occupied by the floating window if the overlap condition is True and if the floating window is not configured to slip to a neighboring location along a specified slip direction.

23. The computer program product of claim 21, said method comprising:
  detecting the event by an operating system that is executing on the computer system; and
  invoking the hook filter to execute said intercepting, said invoking being performed by the operating system by utilizing the association of the hook filter with the event.

24. The computer program product of claim 21, wherein an operating system executing on the computer system maintains a single list that describes a window stack of windows on the computer screen, wherein the window stack is described in the list in accordance with a z-order of the windows on the computer screen such that the windows in the z-order are ordered along a z-axis that extends outward from the computer screen, wherein a topmost window at the top of the z-order overlaps all other windows in the z-order, wherein a window at the bottom of the z-order is overlapped by all other windows in the z-order, and wherein the z-order comprises the floating window and the active window.

25. The computer program product of claim 21, wherein the overlapping condition comprises the floating window overlapping a cursor on the active window.

26. The computer program product of claim 21, wherein said eliminating consists of moving the floating window.

27. The computer program product of claim 26, wherein the action is dependent upon an executing application being executed within the active window, and wherein the executing application consists of the software application.

28. The computer program of product claim 26, wherein the action is dependent upon an executing application being executed within the floating window.

29. The computer program product of claim 21, wherein the event is a window event selected from the group consisting of an initialization of the floating window, a close of the floating window, a minimize of the floating window, a maximize of the floating window, a resize of the floating window, and a move of the floating window.

30. The computer program product of claim 21, wherein the event is selected from the group consisting of a key event triggered by pressing a key on a keyboard that is coupled to the computer system and a mouse event triggered by moving a mouse that is coupled to the computer system.

* * * * *